(12) United States Patent
Liu

(10) Patent No.: US 8,068,396 B2
(45) Date of Patent: Nov. 29, 2011

(54) METHOD FOR ADJUSTING TILT OF OPTICAL PICK-UP HEAD

(75) Inventor: Yao Wen Liu, Hsinchu (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 153 days.

(21) Appl. No.: 12/544,042

(22) Filed: Aug. 19, 2009

(65) Prior Publication Data

US 2010/0074064 A1    Mar. 25, 2010

(30) Foreign Application Priority Data

Sep. 25, 2008 (TW) ................. 97136793 A

(51) Int. Cl.
*G11B 7/00* (2006.01)
(52) U.S. Cl. ........... 369/53.19; 369/44.37; 369/44.41
(58) Field of Classification Search .......... None
See application file for complete search history.

(56) References Cited

U.S. PATENT DOCUMENTS

2005/0024999 A1 * 2/2005 Hsiao ................. 369/44.32
2007/0030774 A1 * 2/2007 Raaymakers ........... 369/44.32

* cited by examiner

*Primary Examiner* — Joseph Haley
(74) *Attorney, Agent, or Firm* — Muncy, Geissler, Olds & Lowe, PLLC

(57) ABSTRACT

A method for adjusting a tilt of an optical pick-up head includes the steps of: moving the optical pick-up head to a first location and focusing on; obtaining a first focus control power and a first optimum tilt angle at the first location; moving the optical pick-up head to a second location and focusing on; obtaining a second focus control power and a second optimum tilt angle at the second location; calculating an optical sensitivity according to the first and second optimum tilt angles, and the first and second focus control powers; and when the head is moved to a specific location where the tilt of the head is to be adjusted, storing a focus control power corresponding to the specific location, and calculating a tilt angle corresponding to the specific location according to the focus control power and the optical sensitivity so that the tilt of the optical pick-up head can be appropriately adjusted.

5 Claims, 5 Drawing Sheets

METHOD FOR ADJUSTING TILT OF OPTICAL PICK-UP HEAD

This application claims priority of No. 097136793 filed in Taiwan R.O.C. on Sep. 25, 2008 under 35 USC 119, the entire content of which is hereby incorporated by reference.

BACKGROUND OF THE INVENTION

1. Field of the Invention

The present invention relates to the technology of an optical storage medium, and more particularly to a method for adjusting a tilt (or tilt angle) of an optical pick-up head.

2. Related Art

Typically, an optical pick-up head of an optical recording and reading device needs an actuator for adjusting an object lens so that this device can read information from the disk or record the information onto the disk at correct locations. This actuator can precisely move the optical pick-up head to the desired location and tilt the optical pick-up head by a correct angle. However, when the optical disk to be read or recorded is curved or the tilt angle of the optical pick-up head is incorrect, the read or recorded information deteriorates. In order to compensate for the information deterioration, the relative tilt angle between the optical pick-up head and the optical disk has to be measured and the tilt angle of the optical pick-up head has to be timely adjusted.

FIG. 1 shows the architecture of a conventional tilt adjusting device. Referring to FIG. 1, this architecture includes an optical pick-up head 10, a tilt angle detector and an object lens 16. The optical pick-up head 10 is pivotally mounted on a rotating shaft 18 and is controlled to rotate by the actuator (not shown in this drawing). The tilt angle detector has a light emitter 12 for emitting light rays, and light receivers 14a and 14b for receiving reflected light rays to detect the tilt angle, according to which the actuator may be controlled. This method has to utilize the tilt angle detector to detect the relative tilt angle between the optical pick-up head and the optical disk to serve as the basis for adjusting the tilt angle of the optical pick-up head.

FIG. 2 shows a method of adjusting a tilt angle of an optical pick-up head without the need of a tilt angle detector. Referring to FIG. 2, a tilt control module 20 includes a reproduction signal generating unit 22, a jitter detector 23, a tilt control unit 24, a tilt actuator 25 and a memory 26. The reproduction signal generating unit 22 converts a radio frequency (RF) signal, generated by the optical pick-up head, into an eight-to-fourteen modulation (EFM) signal, and utilizes a slicer to slice the signal into 0 and 1 signals. The jitter detector 23 receives the EFM signal and detects a jitter amount of the EFM signal. The typical jitter amount is obtained by calculating an extent of back and forth wandering of the EFM signal. The tilt control unit 24 outputs different tilt control values corresponding to different tilt angles of the optical pick-up head, records the corresponding jitter amounts, and screens the tilt control value, corresponding to a minimum jitter amount or a jitter amount smaller than a jitter threshold value, as the tilt control value for the track. The tilt actuator 25 outputs a driving signal to an optical module 21 according to the tilt control value of the tilt control unit 24 to change the tilt angle of the optical pick-up head. The tilt control value may be a digital signal stored in the memory 26, and a digital-to-analog converter (DAC) converts the tilt control value and then outputs the converted tilt control value to the tilt actuator 25. The tilt actuator 25 converts a signal, such as a voltage signal ranging from 0 to 4V and corresponding to the tilt control value, into the driving signal for rotating the optical pick-up head.

Although this method can adjust the tilt angle of the optical pick-up head to a better location without the need of a displacement detector, only the optical disk with the written data can be used to adjust the tilt angle of the optical pick-up head according to the jitter amount of the EFM signal. A blank optical disk cannot be adopted to adjust the tilt control value because the EFM signal cannot be obtained therefrom.

FIG. 3 is a schematic illustration showing a method of calibrating a tilt of an optical pick-up head disclosed in U.S. Patent Publication No. 2005/0117473. As shown in FIG. 3, it is assumed that a surface of an optical disk 31 is an inclined plane in this method. That is, the portion of the optical disk 31 between locations P1 and P2 is regarded as a straight line. After an optical pick-up head 32 is focus-controlled, a fixed distance is kept between the optical pick-up head 32 and the optical disk 31. That is, after the focus control mechanism is enabled, the optical drive outputs a focus control signal (FCS) for controlling up and down movements of a lens of the optical pick-up head according to a focus error (FE) signal such that a fixed distance is kept between the lens of the optical pick-up head and the optical disk 31. So, as shown in FIG. 3, when the optical pick-up head 32 is located at the locations P1 and P2, the relative distances between the lens of the optical pick-up head and the optical disk 31 are constant. Therefore, the tilt angle can be calculated only according to the distance λ between the locations P1 and P2 and the corresponding height difference (lens motion distance β) between the locations P1 and P2. The tilt angle is calculated according to the following equation:

$$\theta = \tan^{-1}\left(\frac{\beta}{\lambda}\right)$$

In fact, however, the surface of the optical disk is not an inclined plane but approximates a curved surface. So, the assumptions mentioned hereinabove only can be made when the distance between the locations P1 and P2 is very small and when the optical disk is not seriously curved. If the optical disk is seriously curved, various locations on the optical disk have to be measured so that the above-mentioned method can precisely calibrate the tilt angle of the optical pick-up head. However, the spent time becomes longer with the increase of the number of the locations. In addition, the above-mentioned method is to approach a curve with straight lines.

SUMMARY OF THE INVENTION

It is therefore an objective of the present invention to provide a method and a system for adjusting a tilt of an optical pick-up head to effectively solve the problem of the unstable writing or reading quality.

The present invention achieves the above-identified or other objectives by providing a method for adjusting a tilt of an optical pick-up head. The optical pick-up head, located at a focus location distant from an optical recording medium by a predetermined distance, is for outputting a recording light beam with a predetermined power to the optical recording medium so as to write corresponding optical data onto the optical recording medium. The method for adjusting the focus location of the optical pick-up head includes the steps of: moving the optical pick-up head to a first location of the optical recording medium and focusing on; obtaining a first focus control power corresponding to the first location; changing a tilt angle of the optical pick-up head at the first location and thus sensing a light beam reflected from the optical recording medium to obtain a first optimum tilt angle; moving the optical pick-up head to a second location of the optical recording medium and focusing on; obtaining a second focus control power corresponding to the second location; changing the tilt angle of the optical pick-up head at the second location and thus sensing a light beam reflected from the optical recording medium to obtain a second optimum tilt angle; calculating an optical sensitivity according to the first optimum tilt angle, the second optimum tilt angle, the first focus control power and the second focus control power; focusing on when the optical pick-up head is moved to a specific location to obtain a focus control power corresponding to the specific location; and calculating a corresponding tilt angle according to the optical sensitivity and the focus control power corresponding to the specific location.

The spirit of the present invention is to utilize a predetermined angle changing procedure to select at least two points on the optical recording medium, to respectively obtain the individual optimum tilt angles while recording focus control powers at this two points, and to finally obtain an optical sensitivity by way of calculation. In the procedure of reading or writing the data, the corresponding focus control power is read, and the corresponding tilt angle is calculated according to the optical sensitivity and the corresponding focus control power so that the tilt angle of the optical pick-up head can be calibrated in a real-time manner and the data reading or writing quality can be stabilized. Because the present invention only needs the optimum tilt angles corresponding to at least two points, the time of calibrating the tilt angle can be shortened. In the conventional method, the optimum tilt angles corresponding to multiple points are needed in order to overcome the non-linear variation of the tilt angle of the disk from inside to outside. Alternatively, the conventional method of taking a few points followed by the linear interpolation may be performed in order to save the time. However, the real tilt angle cannot be completely reflected. Compared with the prior art, the present invention can save the time and can reflect the real tilt angle in the real-time manner.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
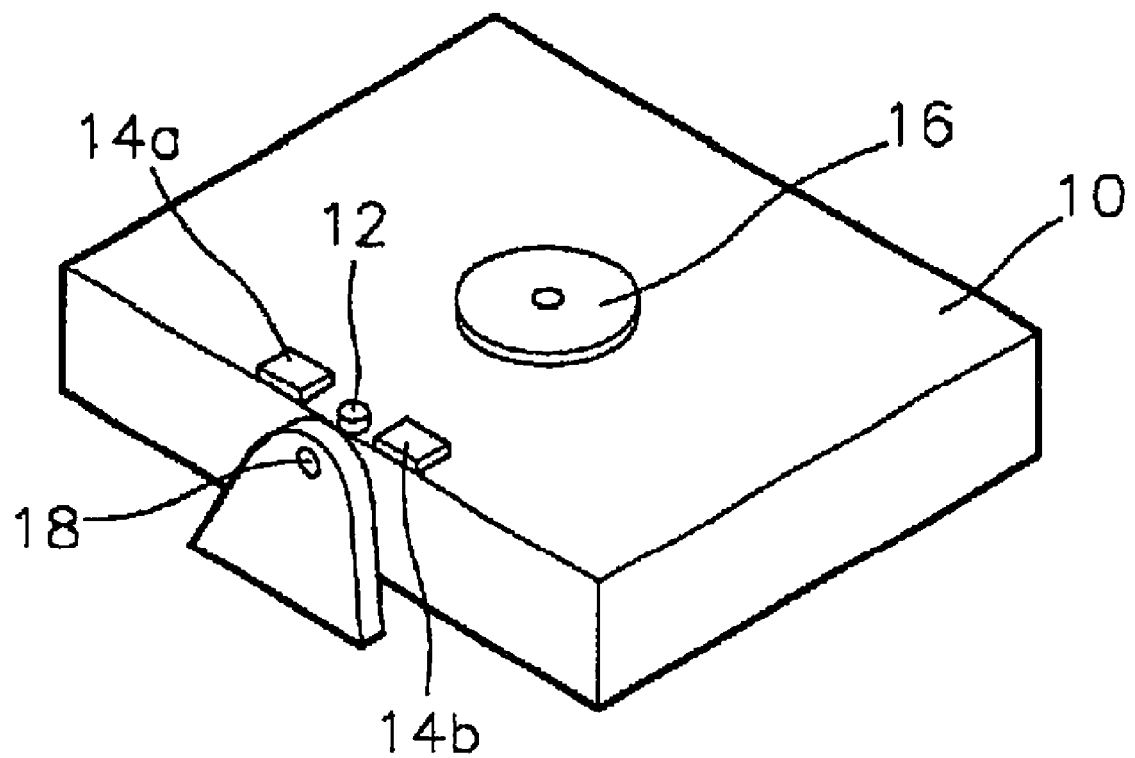
FIG. 1 shows the architecture of a conventional tilt adjusting device.
Figure 2:
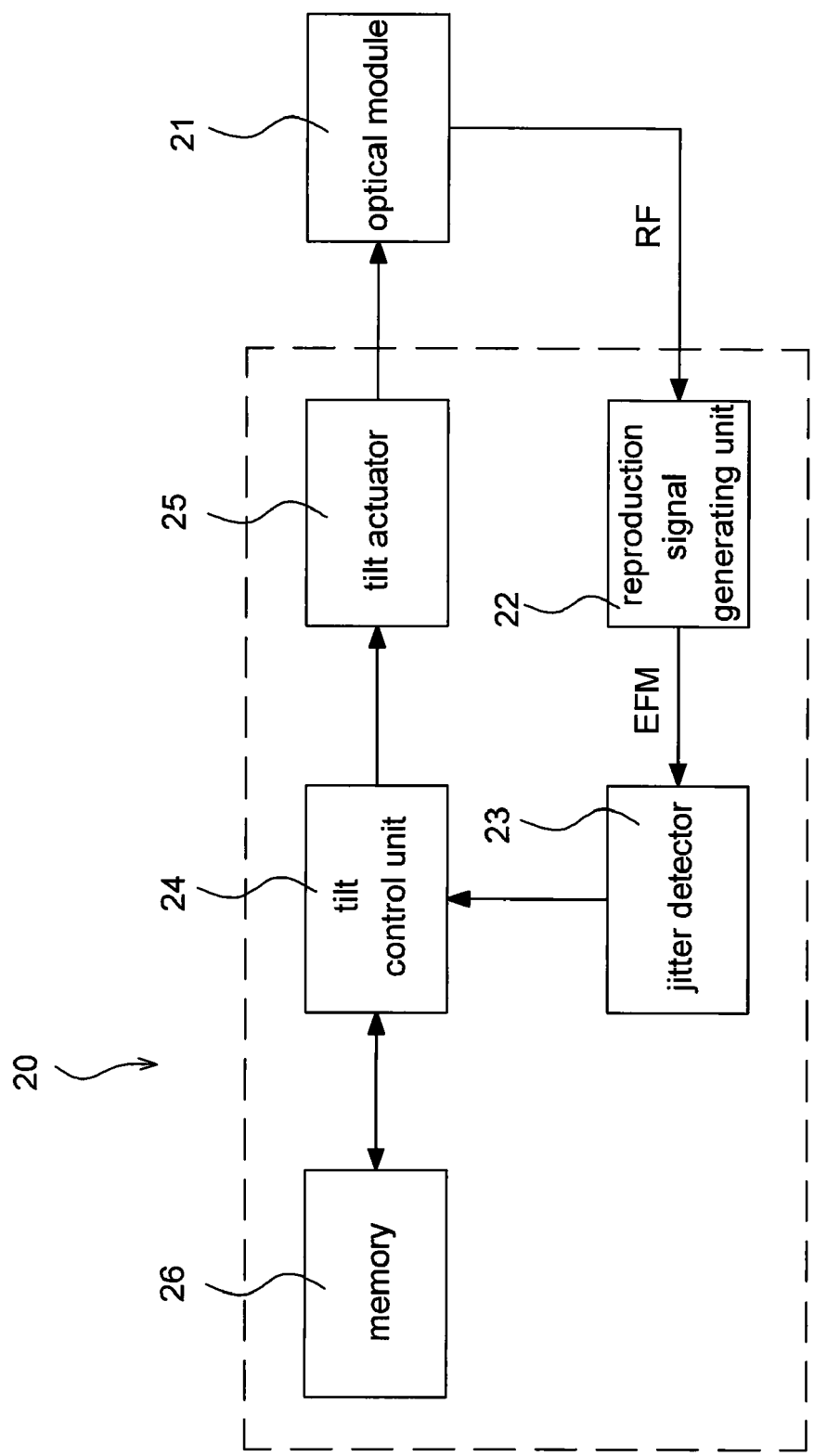
FIG. 2 shows a method of adjusting a tilt angle of an optical pick-up head without the need of a tilt angle detector.
Figure 3:
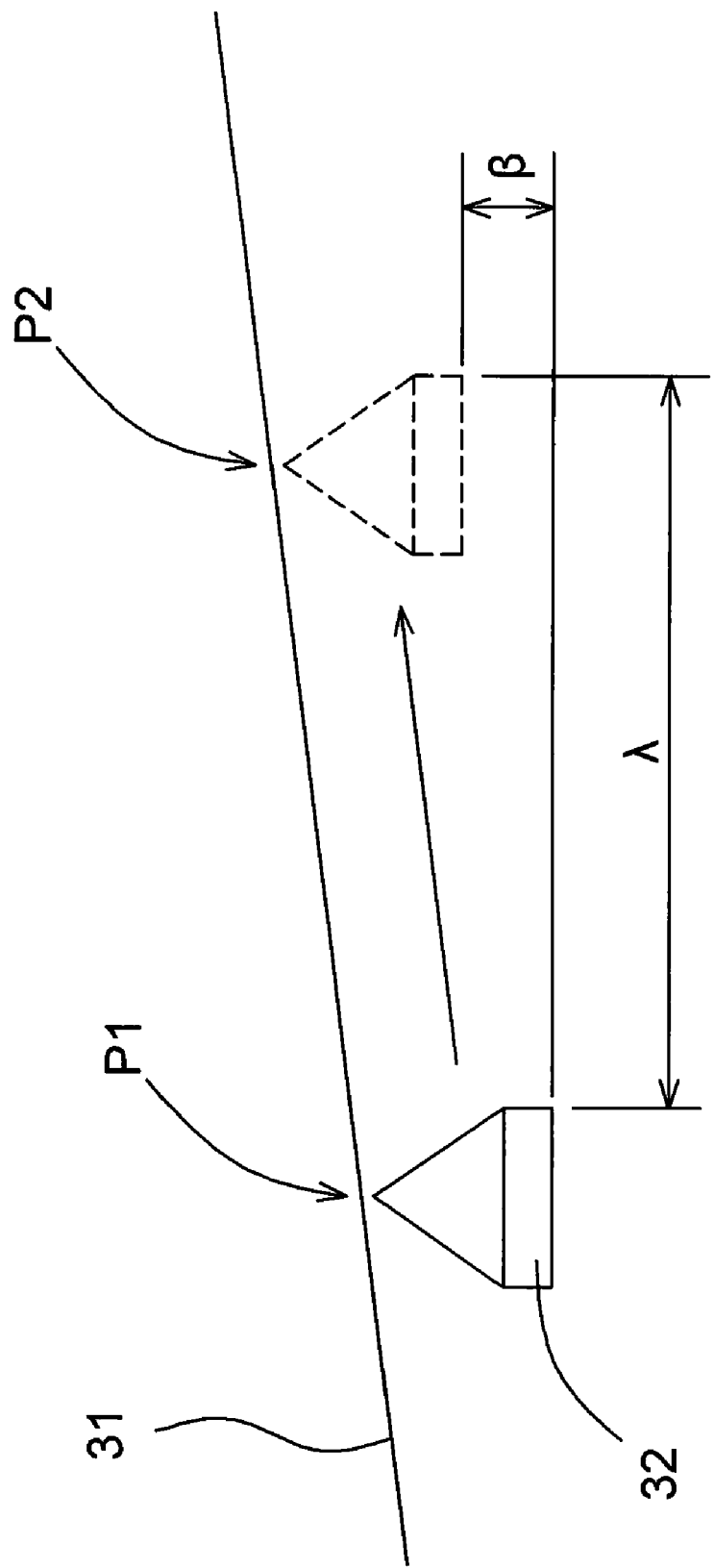
FIG. 3 is a schematic illustration showing a method of calibrating a tilt of an optical pick-up head disclosed in U.S. Patent Publication No. 2005/0117473.
Figure 4:
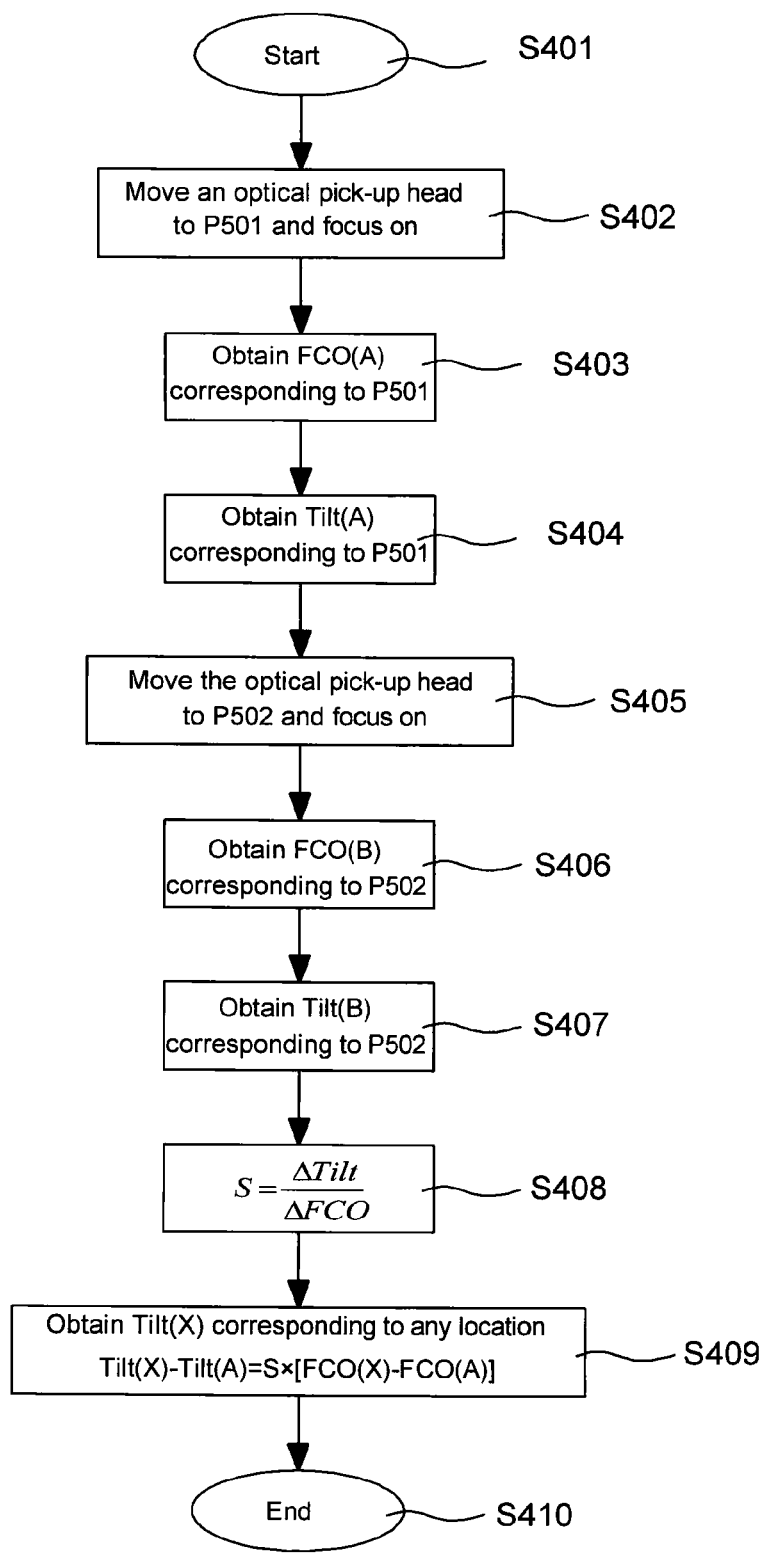
FIG. 4 is a flow chart showing a method for adjusting a tilt of an optical pick-up head according to an embodiment of the present invention.
Figure 5:
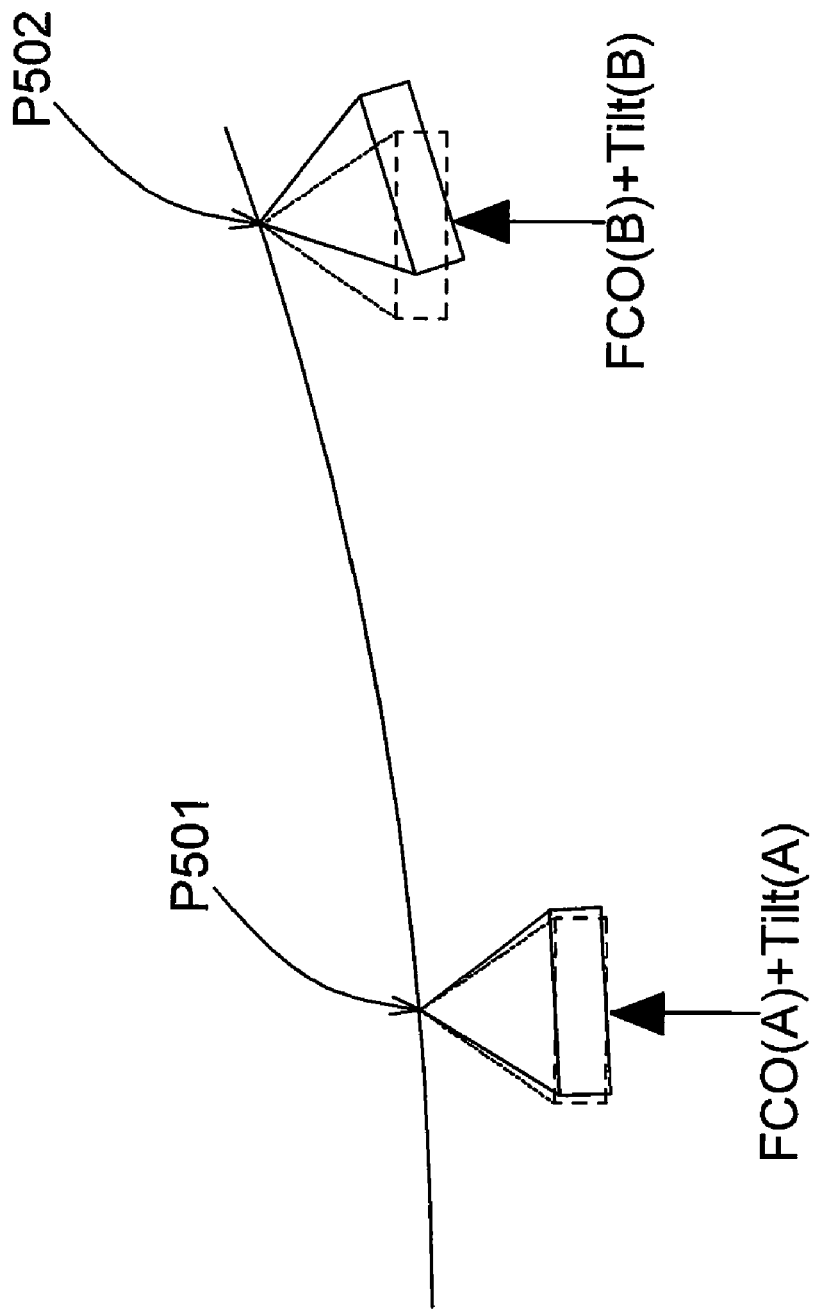
FIG. 5 is a schematic illustration showing the method for adjusting the tilt of the optical pick-up head according to the embodiment of the present invention.

FIG. 4 is a flow chart showing a method for adjusting a tilt of an optical pick-up head according to an embodiment of the present invention. FIG. 5 is a schematic illustration showing the method for adjusting the tilt of the optical pick-up head according to the embodiment of the present invention. Referring to FIGS. 4 and 5, the method for adjusting the tilt of the optical pick-up head includes the following steps.

In step S401, the procedure starts.

In step S402, the optical pick-up head is moved to a first location and the focus function is enabled so that the optical pick-up head focuses on. As shown in FIG. 5, the optical pick-up head is firstly moved to the location P501, and focuses on at this location.

In step S403, a first focus control power corresponding to the first location is obtained. The method of obtaining the first focus control power is well known in the art, so detailed description thereof will be omitted.

In step S404, the tilt angle of the optical pick-up head is changed, and the light beam reflected from an optical recording medium is sensed so that a first optimum tilt angle may be calculated. Generally speaking, the optimum tilt angle may be obtained by changing the tilt angle and detecting when a push-pull signal reaches the maximum, wherein the push-pull signal preferably comprises a main beam push pull signal (MPP) signal, a secondary push-pull (SPP) signal or a differential push-pull (DPP) signal. At this time, it is possible to obtain the optimum tilt angle output and thus the optimum tilt angle corresponding to this location.

In step S405, the optical pick-up head is moved to a second location of the optical recording medium and focuses on. As shown in FIG. 5, the optical pick-up head is firstly moved to the location P502, and focuses on at this location.

In step S406, a second focus control power corresponding to the second location is obtained.

In step S407, the tilt angle of the optical pick-up head is changed, the light beam reflected from the optical recording medium is detected, and a second optimum tilt angle is obtained.

In step S408, an optical sensitivity is calculated according to the first optimum tilt angle, the second optimum tilt angle, the first focus control power and the second focus control power. Herein, the mathematical expression of the optical sensitivity is defined as follows:

$$S(\text{Sensitivity}) = [\text{Tilt}(B) - \text{Tilt}(A)] / [FCO(B) - FCO(A)] = \frac{\Delta \text{Tilt}}{\Delta FCO}$$

wherein S represents the optical sensitivity, Tilt(A) represents the first optimum tilt angle corresponding to the location P501, Tilt(B) represents the second optimum tilt angle corresponding to the location P502, FCO(A) represents the first optimum focus control power corresponding to the location P501, FCO(B) represents the optimum focus control power corresponding to the location P502, ΔTilt represents the difference between Tilt(B) and Tilt(A), and ΔFCO represents the difference between FCO(B) and FCO(A). The above-mentioned mathematical expression is only illustrated as an example, and ΔTilt may also be defined as [Tilt(A)−Tilt(B)] while ΔFCO may be defined as [FCO(A)−FCO(B)].

In addition, in another embodiment of the present invention, when the optical sensitivity is obtained according to more than two locations and the focus control powers and tilt angles corresponding thereto, the optical sensitivities of any two points can be obtained according to the steps S402 to S408. Then, the average of the optical sensitivities may be obtained to serve as the optical sensitivity. In this case, the optical pick-up head further has to be moved to the other locations of the optical recording medium after the step S408 and before the step S409, and the optical sensitivity is calculated according to the optimum tilt angles and the focus control powers corresponding to any two locations. Then, the average of the optical sensitivities is obtained by way of calculation to serve as the optical sensitivity for calibrating the tilt angle of the optical pick-up head in step S409.

In the step S409, the tilt angle is calibrated. In this step, the optical pick-up head is moved to a specific location X and focuses on when data is being read or written. Then, the focus control power FCO(X) corresponding to the specific location X is obtained. Next, the tilt angle Tilt(X) is calculated according to the obtained optical sensitivity S and the focus control power FCO(X) corresponding to the to-be-calibrated specific location X. The mathematical expression of the tilt angle Tilt(X) is expressed as follows:

$$Tilt(X)-Tilt(A)=S\times [FCO(X)-FCO(A)]$$

Thus, the tilt angle of the optical pick-up head can be calibrated in a real-time manner, and the data reading or writing quality can be stabilized.

In step S410, the step ends.

It is to be noted that the mathematical expression of the optical sensitivity shows a linear equation and the calibrated mathematical expression is also a linear equation. However, because the optical disk does not correspond to a linear straight line and the focus control power changes with the curved variation of the optical disk, the measured focus control power is non-linear. Consequently, even if only the optimum tilt angles and the optimum focus control powers corresponding to the locations P501 and P502 are measured in the embodiment of the present invention, the non-linear calibration (i.e., the calibration similar to the curved surface calibration) can be achieved according to this calibration method. Correspondingly, the calibration method according to the embodiment of the present invention can approach the real condition of the curved optical disk much more.

Compared with the prior art, if the prior art needs to overcome the condition of the non-linear variation of the tilt angle of the disk from inside to outside, more optimum tilt angles corresponding to more points are needed so that a lot of time is wasted. In addition, if only a few optimum tilt angles corresponding to a few points are obtained and the calibration of linear interpolation is performed in order to save the time, the real tilt angle cannot be reflected in a manner like that of the embodiment of the present invention. Compared with the prior art, the present invention only needs to detect the optimum tilt angles corresponding to at least two points. So, the time can be saved and the real tilt angle can be reflected in a real-time manner.

In the above-mentioned embodiment, the main beam push pull signal, the secondary light beam push-pull signal and the differential push-pull signal are illustrated as example. However, one of ordinary skill in the art may easily understand that other signals may also be adopted. Thus, the present invention is not particularly limited to the above-mentioned signals.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for adjusting a tilt of an optical pick-up head, the method comprising the steps of:

moving the optical pick-up head to a first location distant from an optical recording medium and focusing on to obtain a first focus control power and a first optimum tilt angle corresponding to the first location;

moving the optical pick-up head to a second location distant from the optical recording medium and focusing on to obtain a second focus control power and a second optimum tilt angle corresponding to the second location;

calculating an optical sensitivity according to the first optimum tilt angle, the second optimum tilt angle, the first focus control power and the second focus control power; and obtaining a focus control power corresponding to a specific location after the optical pick-up head is moved to the specific location, and calculating a corresponding optimum tilt angle according to the focus control power and the optical sensitivity so that the tilt of the optical pick-up head may be adjusted, wherein the optical sensitivity is represented as:

$$S=[Tilt(2)-Tilt(1)]/[FCO(2)-FCO(1)],$$

wherein S represents the optical sensitivity, Tilt(2) represents the second optimum tilt angle, Tilt(1) represents the fist optimum tilt angle, FCO(2) represents the second focus control power and FCO(1) represents the first focus control power.

2. The method according to claim 1, wherein the optimum tilt angle corresponding to the specific location is represented as:

$$Tilt(X)-Tilt(1)=S\times [FCO(X)-FCO(1)],$$

wherein Tilt(X) is the optimum tilt angle corresponding to the specific location, and FCO(X) is the focus control power corresponding to the specific location.

3. The method according to claim 1, wherein the step of obtaining the optimum tilt angle comprises:

changing the tilt of the optical pick-up head;

detecting a push-pull signal corresponding to the tilt; and using the tilt as the optimum tilt angle when the push-pull signal reaches a maximum.

4. The method according to claim 3, wherein the push-pull signal comprises a primary push-pull signal, a secondary push-pull signal or a differential push-pull signal.

5. The method according to claim 1, further comprising the steps of:

moving the optical pick-up head to different locations distant from the optical recording medium, and calculating a plurality of optical sensitivities according to optimum tilt angles and focus control powers corresponding to any two of the different locations; and obtaining an average of the plurality of optical sensitivities to serve as the optical sensitivity, according to which the optimum tilt angle of the specific location is calculated.

* * * * *